UNITED STATES PATENT OFFICE.

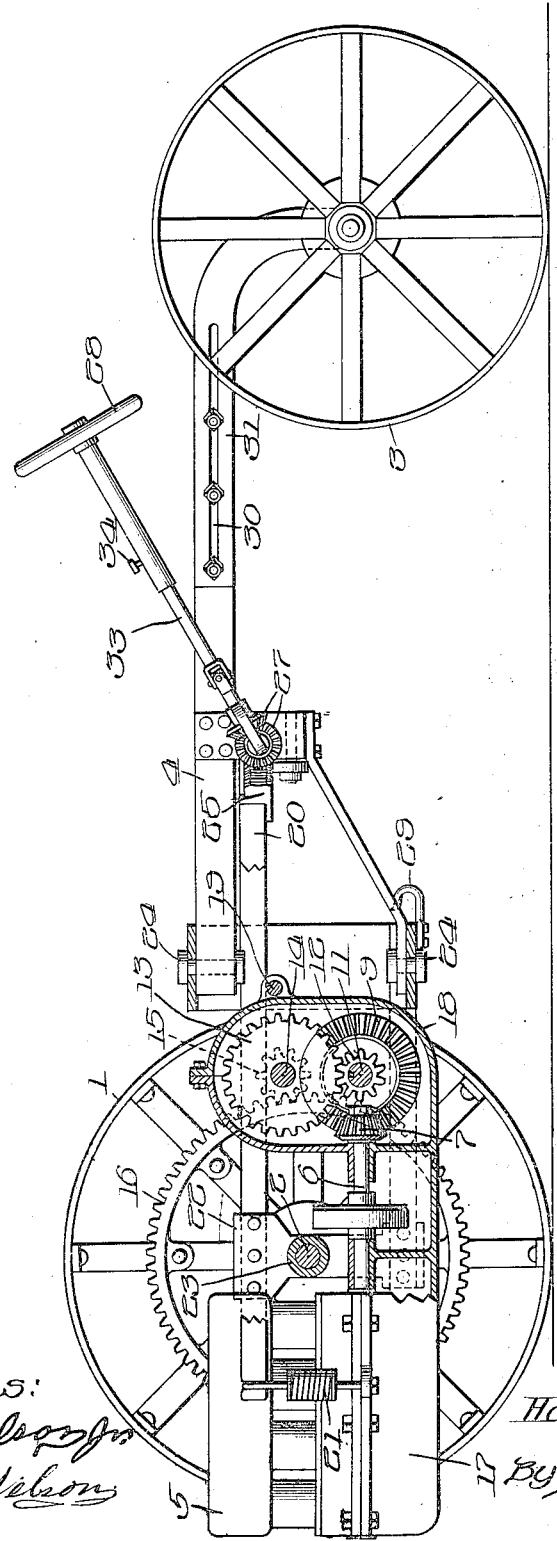

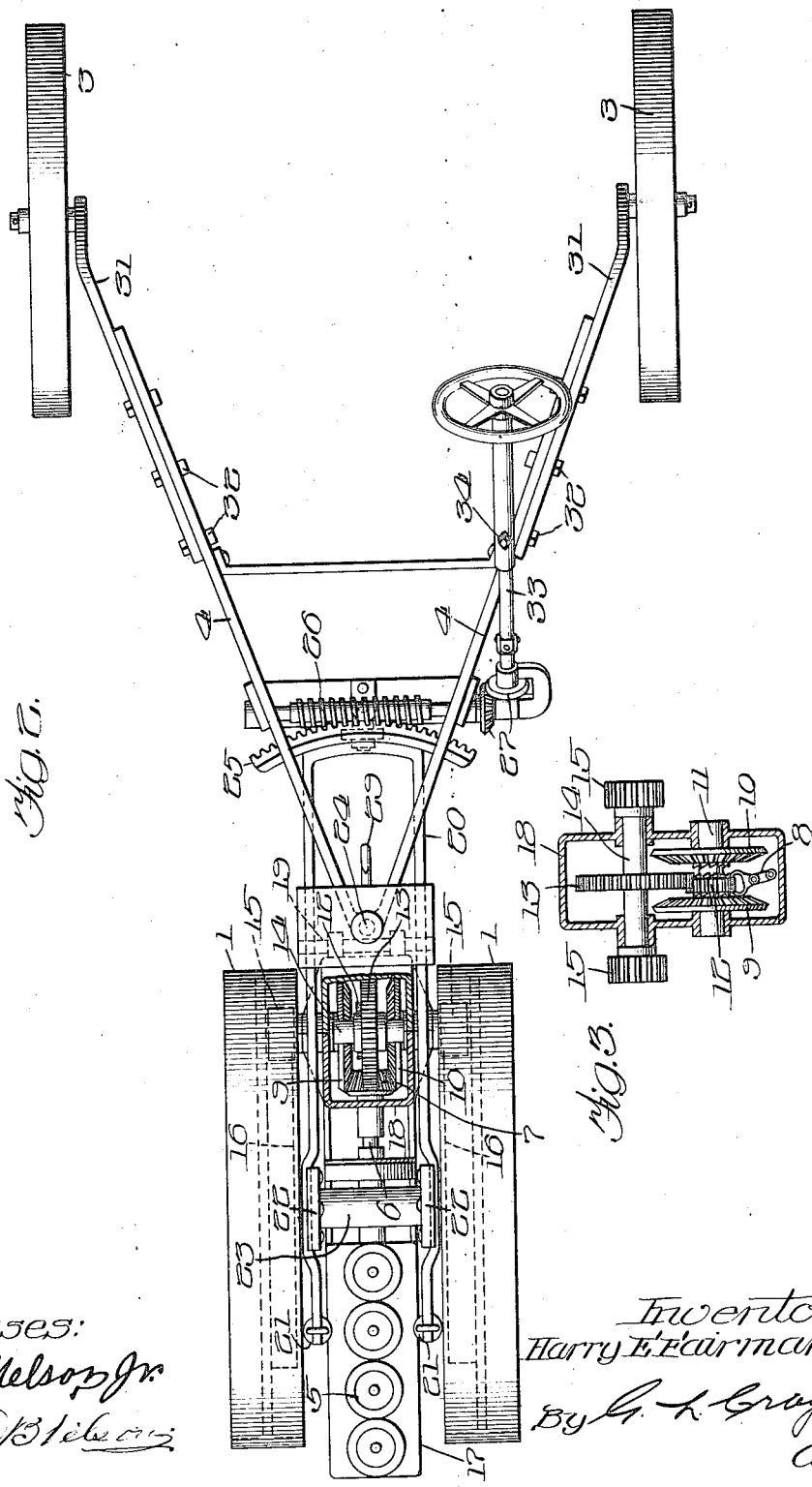

HARRY E. FAIRMAN, OF DAVENPORT, IOWA.

SELF-PROPELLED VEHICLE.

1,210,055.　　　　　Specification of Letters Patent.　　Patented Dec. 26, 1916.

Application filed December 18, 1911. Serial No. 666,551.

*To all whom it may concern:*

Be it known that I, HARRY E. FAIRMAN, citizen of the United States, residing at Davenport, in the county of Scott and State of Iowa, have invented a certain new and useful Improvement in Self-Propelled Vehicles, of which the following is a full, clear, concise, and exact description, reference being had to the accompanying drawings, forming a part of this specification.

My invention relates to self-propelled vehicles and is of particular service in connection with that class of self-propelled vehicles that include tractors, though it is to be understood that my invention is not to be limited to tractors as the invention is adaptable to other self-propelled vehicles.

It is one general object of my invention to provide a construction wherein the power plant of the vehicle constitutes a portion of a unitary structure that includes the steering wheel or wheels of such vehicle, the power plant being mounted so as to be moved bodily with the steering wheel or wheels irrespective of the planes of rotation to which the steering wheels are shifted.

In one embodiment of the invention two closely approached steering wheel elements are employed which are fixedly coupled, by which arrangement the presence of a differential gearing between the engine and steering wheels is avoided. I do not wish to be limited, however, to the absence of differential gearing between engine and steering wheels. In the preferred embodiment of the invention the power plant and the steering wheel or wheels are located at the forward portion of the vehicle, by which forward arrangement the direction of travel of the vehicle is very readily controlled by the operator.

I will explain my invention more fully by reference to the accompanying drawings showing one embodiment thereof, to which embodiment I do not limit myself, and which drawings show enough parts of a self-propelled vehicle to render an understanding of my invention clear.

In the drawings Figure 1 is a side elevation of a tractor, certain parts being shown in section, while other parts, which are not necessary to an understanding of my invention, are omitted; Fig. 2 is a plan view of the structure illustrated in Fig. 1, certain parts being shown in section; and Fig. 3 is a detail view showing mechanism for reversing the travel of the vehicle.

Like parts are indicated by similar characters of reference throughout the different figures.

The tractor illustrated includes four wheel elements, two of the wheel elements 1 together constituting a steering wheel, since these two elements 1 are desirably rigidly secured to a common axle 2, when such steering wheel elements 1 are so closely approached as to render differential movement between the same unnecessary for the purpose of steering. The remaining wheel elements 3 are trailing wheels which serve, in coöperation with the steering wheels, to determine the direction of travel of the vehicle and also to carry or effect the travel of the load. These wheels 3 obviously also suitably serve to establish equilibrium for the steering wheels in the particular embodiment of the invention illustrated.

I do not wish to limit myself to wheeled elements 3 for performing the functions which these elements perform, since other devices such as wheeled cultivators may be substituted for the portion of the vehicle that is provided with the trailing wheels 3. The steering wheel members 1 are desirably placed at the forward portion of the vehicle and while these members are shown as being in fixed relation, owing to their proximity, I do not wish to be limited to such fixed relation. As the invention is embodied, the split steering wheel may travel between plant rows and the trailing wheels 3 may travel outside of the plant rows between which the steering wheel travels, the side members of the trailing frame 4 being suitably arched or suitably elevated at their top portions to clear the plants to which the tractor is adapted. The trailing frame is detachably secured to the steering wheel truck so that other vehicles or loads may be substituted therefor.

The engine or motor which I preferably employ is an internal combustion hydrocarbon engine 5 having a main shaft 6 extending longitudinally of the vehicle, this shaft carrying a beveled pinion 7 at its rear end. Shifting mechanism 8 serves to determine the direction of rotation of the shaft 11 carrying the gears 9 and 10, which are upon opposite sides of the pinion 7, and in constant mesh therewith. The gears 9 and 10 are loosely mounted upon a shaft 11. The shaft 11 carries a spur pinion 12 in mesh with a spur gear 13 upon a shaft 14, the pinion being splined upon shaft 11 so as to rotate therewith and to be movable longitudinally thereof. The shifter 8 serves to move the pinion 12 to clutch engage it with one or the other of the gears 9, 10 whereby the direction of rotation of the shaft 11 is determined and the vehicle is propelled forwardly or backwardly. The shaft 14 fixedly carries spur pinions 15 upon its ends. The steering wheel portions 1 carry spur gears 16 that are in mesh with the spur pinions 15, whereby the wheel members 1 are rotated in unison to effect the propulsion of the vehicle forwardly or rearwardly according to the direction of rotation of the shaft 11 which is arbitrarily determined by the operator through the agency of the shifting mechanism 8. The power plant described is interposed between the steering wheel elements 1 and is carried by said steering wheel elements whereby the weight of the power plant is directly made effective for traction purposes. The power transmission mechanism which is located between the wheel members and intervenes between the motor and said wheel members is in tandem with the motor whereby the wheels may be closely approached.

The engine includes an oil containing crank case 17 which is desirably continued to form a casing 18 for the gearing 7, 9, 10, 12 and 13. The casing composed of the parts 17 and 18 constitutes a support for the power plant as it carries the journals for the rotating elements of the power plant. This power plant supporting casing is pivotally connected at 19 with the steering truck frame 20 at a point preferably located to the rear of the steering wheel axle 2. The power plant is carried upon the steering wheel axle 2 and the parts are preferably so distributed that the combined weight of the power plant and the truck frame 20 is evenly distributed upon the front and rear sides of the axle 2. The greater part of the weight of the power plant is disposed below the axle 2. The power plant supporting casing 17 and 18 is desirably flexibly suspended from a portion of the steering wheel axle 2, the flexible suspension being secured by coil springs 21 intervening between the forward ends of the truck frame 20 and the crank casing 17. The truck frame includes vertical struts 22 which intervene between top and bottom portions of the truck frame. A sleeve 23 extends transversely between the struts 22 and is rigid with respect thereto. This sleeve 23 constitutes a bearing for the steering wheel axle 2.

The truck frame is adapted to be swung in a horizontal plane about a pivot structure 24, the vertical axis of rotation afforded by the pivot structure 24 for the truck frame being desirably located to the rear of the steering wheel axis. Any suitable means may be employed for turning the steering wheel truck frame so as to alter the plane of rotation of the steering wheel elements 1 for the purpose of guiding the vehicle. In the embodiment of the invention illustrated, I have employed a segmental rack 25 carried by the truck frame and engaged by a worm shaft 26 that may be turned by gearing 27 operated by a steering wheel 28 and the shaft which intervenes between the same and the gears 27. By means of the steering wheel 28 the truck frame 20 may be swung with respect to the trailing frame with which the truck frame is pivotally connected at 24 so that the planes in which the steering wheel elements 1 turn may be varied to suit the direction in which the vehicle is to travel, the power plant turning with said steering wheels, the entire construction being such that the planes of the steering wheel elements do not change materially with respect to the vertical plane in which the power plant is disposed.

An attaching device 29, located at the lower rear corner of the truck frame 20, is provided for the attachment of cultivating implements or other loads that are suitable for attachment at this place to the self-propelled vehicle, the point 29 being located sufficiently below the horizontal plane including the axis of rotation of the steering wheel elements 1 as to cause a portion of the load attached at 29 to be directly carried by the steering wheel axle 2 whereby the tractive effort of the steering wheels is increased so that a lighter structure may be employed, the point of attachment 29 being located between the wheels 1 and 3 and sufficiently close to the wheel elements 1 as to secure the advantage which has been stated.

The trailing frame 4 is, in the embodiment of the invention being described, provided with slots 30 while the trailing wheels are mounted upon trailing frame branches 31 that are separably secured to the balance of the trailing frame by means of bolts 32 whose shanks pass through the slots 30 and which bolts serve to secure the trailing frame branches 31 in various positions to which the frame branches 31 may be adjusted. That is, the branches of the trailing frame which couple the trailing frame with the trailing wheels are extensible and contractible, whereby the distance between the trailing wheels 3 and the engine portion of the vehicle may be adjusted. The side members of the trailing frame 4 desirably also diverge toward the rear of the vehicle so that as the trailing frame branches 31 are adjusted the distance between the trailing wheels 3 may be varied to suit the lines of travel that these wheels are to follow between plant rows.

The shaft of the steering wheel 28 is extensible and contractible so that said steering wheel may be located in a position suited to the operator's seat on the vehicle that happens to be drawn. The steering wheel 28 is physically associated with the usual mechanism that enters into the control of the engine and, as such associate equipment is well understood by those skilled in the art, a description thereof will not be essential. While the motor preferably turns the steering wheels in order to effect the propulsion of the vehicle, and is mounted upon the steering wheel truck so as to turn bodily with said truck, I do not wish to be limited to these characteristics in all embodiments of the invention.

Reference may be had to my co-pending application Serial No. 666,552, filed December 18, 1911.

Claims which cover certain of the features herein shown form the subject matter of my co-pending application Serial No. 800,435, filed November 12, 1913.

While I have herein particularly described and illustrated the preferred embodiment of the invention I do not wish to be limited to the precise details of construction shown as changes may readily be made without departing from the spirit of the invention. While I have shown the invention as embodied in a tractor it is obvious that the invention is not to be limited to such a self-propelled vehicle.

Having thus described my invention, I claim as new and desire to secure by Letters Patent the following:—

1. A self-propelled vehicle including a wheel portion having two closely approached wheel members; a truck in which said wheel members are journaled, this truck being adapted for swinging adjustment to change the planes in which said wheel members rotate; a motor carried by said wheel members so as to swing therewith; and power transmission mechanism located between the wheel members and intervening between the motor and said wheel members whereby said wheel members may be driven, this power transmission mechanism and motor being located in tandem to permit of the close approach of the wheels.

2. A self-propelled vehicle including a wheel portion having two closely approached wheel members; a truck in which said wheel members are journaled, this truck being adapted for swinging adjustment to change the planes in which said wheel members rotate; a motor; and power transmission mechanism located between said wheel members and intervening between the motor and said members whereby said wheel members may be driven, this power transmission mechanism and motor being located in tandem to permit of the close approach of the wheels.

In testimony whereof, I hereunto subscribe my name this 15th day of December, A. D., 1911.

HARRY E. FAIRMAN.

Witnesses:
G. L. CRAGG,
E. L. WHITE.